HIGH SPEED TELEGRAPH SYSTEM

Filed April 26, 1954 5 Sheets-Sheet 1

INVENTOR

Ivan Willard Conrad

BY

John B. Brady

ATTORNEY

Aug. 30, 1960 I. W. CONRAD 2,951,121

HIGH SPEED TELEGRAPH SYSTEM

Filed April 26, 1954 5 Sheets-Sheet 2

INVENTOR

Ivan Willard Conrad,

BY

John B. Brady

ATTORNEY

INVENTOR

Ivan Willard Conrad,

BY John B. Brady

ATTORNEY

Aug. 30, 1960 I. W. CONRAD 2,951,121

HIGH SPEED TELEGRAPH SYSTEM

Filed April 26, 1954

5 Sheets-Sheet 4

INVENTOR

Ivan Willard Conrad,

BY

John B. Brady

ATTORNEY

Aug. 30, 1960 I. W. CONRAD 2,951,121

HIGH SPEED TELEGRAPH SYSTEM

Filed April 26, 1954 5 Sheets-Sheet 5

INVENTOR

Irvan Willard Conrad,

BY John B. Brady

ATTORNEY 2,951,121

HIGH SPEED TELEGRAPH SYSTEM

Ivan Willard Conrad, 810 Crescent Drive, Alexandria, Va.

Filed Apr. 26, 1954, Ser. No. 425,410

27 Claims. (Cl. 178—23)

The present invention relates to high speed printing telegraphy and has for its principal object to provide simple, practical, extremely high speed means for recording at a receiving station characters such as the alphabet, numerals, or other symbols selected at a sending station.

This application is a continuation in part of my application Serial Number 407,378, filed February 1, 1954, for High Speed Telegraph System.

Essentially, my present invention is a continuation of the improvements disclosed in my copending application Serial No. 407,378, supra, and comprises further improvements which I have made in the high speed character recording systems disclosed in my Letters Patents No. 2,178,989 of Nov. 7, 1939, for System of Telegraphy, and No. 2,248,522, of July 8, 1941, for Automatic Telegraphy in order to increase the speed of recording and in order to better adapt said recording systems for high speed computer application. It is noted that in Letters Patents No. 2,178,989 and No. 2,248,522, supra, and in the present application, the word "electrodic" is used to describe the nature of certain characters and other components which comprise electrodes. Webster's Collegiate Dictionary, 5th edition, page 493, defines the suffix "-ic" as forming adjectives denoting "consisting of, characterized by—," thus as used by applicant, "electrodic" means "consisting of or characterized by electrodes." While the characters to be recorded can be selected manually, as by keyboard, preferred selection is by electro-mechanical or electronic means, as by perforated control tape, output of electronic digital computers, and the like. The continuation of improvements relates both to the recording process itself, as in the use of electrostatic, magnetic and thermal energy gradients acting on a sensitized material to produce the recorded character; and also to the physical arrangement of the recording components, as for example, the placement of all recording components on the same side of the medium. The claims in the instant application set forth the use of energy gradients and specify the kind of energy gradient and recite the changes in physical structure which are produced.

Primarily the improvement in speed of recording is achieved by completing the recording of one or more entire lines of material within the same time interval required for printing a single complete character under the disclosure of my Letters Patents No. 2,178,989 and No. 2,248,522, supra. Achievement of this objective thus permits an improved "page printer" result. It is noted that the disclosures of my aforesaid Letters Patents No. 2,178,989 and No. 2,248,522 permitted the instantaneous recording of a single complete character, first by eliminating from the recording action all mechanical inertia, otherwise inherent in "stop-start" or other types of printers employing accelerated mechanical components, such as selector relays in the recording process, and, secondly, by employing in the recording process only effects and phenomena associated with the flow of electric current in some form, that is, the phenomena generally encompassed in the term "electronic" or "electronic action." It is emphasized that in no case is a single character recorded by a time sequence of individual points, but that all points necessary to outline the desired character are recorded simultaneously.

With the foregoing general object in view, the invention consists in the novel combinations and arrangements of features as will be hereinafter more fully described, illustrated in the accompanying drawings, and defined in the appended claims.

In the accompanying drawings, wherein are illustrated different practical embodiments of the invention and wherein like characters of reference denote corresponding parts in related views.

Figure 21:
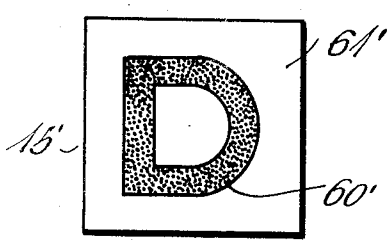
Fig. 21 is a side elevation of a magnetically recordable character suitable for use in the embodiment of Fig. 19.
Figure 20:
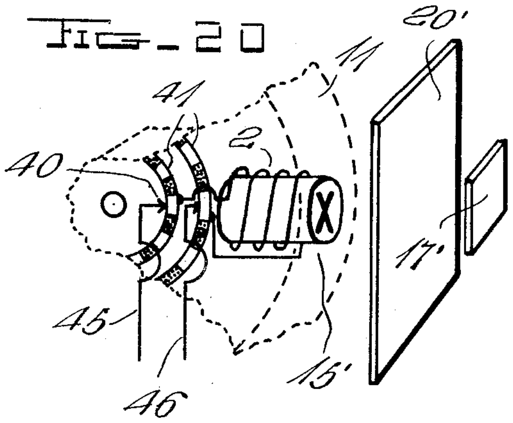
Fig. 20 is a diagrammatic view of a magnetically recordable character suitable for use in the general embodiment of Fig. 3.
Figure 22:
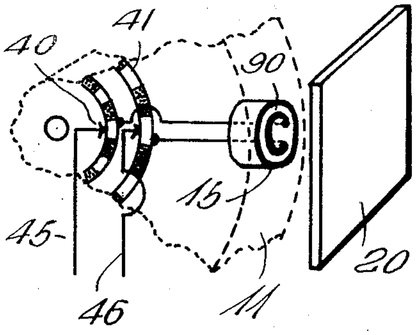
Fig. 22 is a diagrammatic view of a thermally recordable character suitable for use in the general embodiment of Fig. 3.
Figure 24:
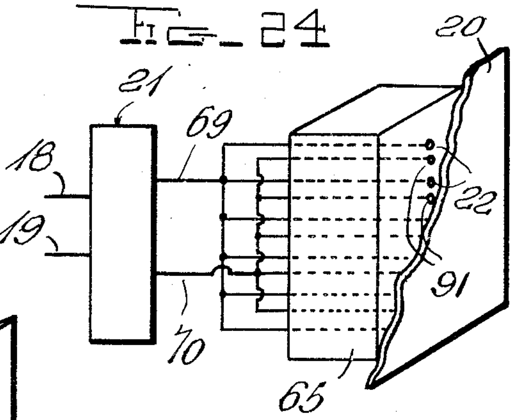
Fig. 24 is a diagrammatic view of an alternative character matrix embodiment suitable for use in Figs. 12, 13 and 15.
Figure 23:
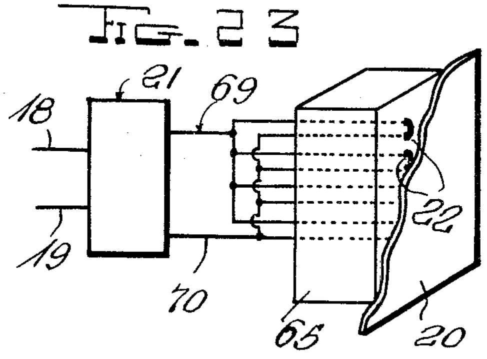
Fig. 23 is a diagrammatic view of a thermally recordable character suitable for use in the embodiment of Figs. 12, 13 and 15.

The invention set forth in this application constitutes improvement over the invention of application 407,378, supra, by defining the use of energy gradients, the kinds of energy gradients, the placement of the recording components on the same side of the recording medium, and the changes in physical structure. Figs. 18–24 show embodiments of the invention constituting improvements or modifications over copending application 407,378, supra. Figs. 23 and 24 show particularly the manner of locating all recording components on the same side of the recording medium.

Figure 1:
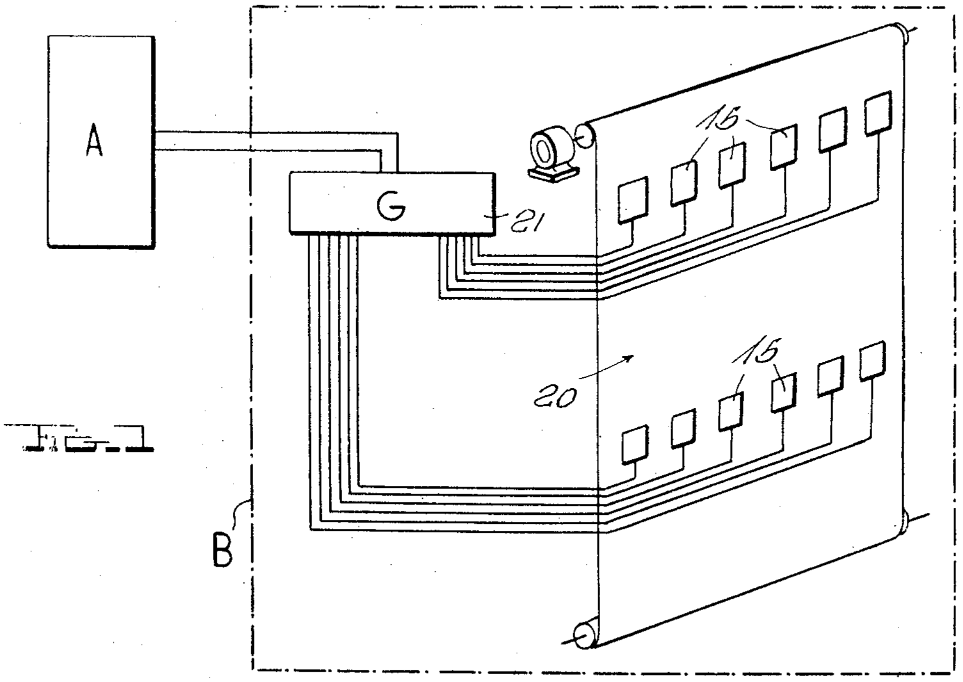
Figure 1 is a diagrammatic view illustrating the general principle of the invention.

Referring to the drawings in detail, and specifically to Fig. 1, A and B designate generally and respectively sending station and page printer receiving station mechanisms, including character recording medium 20 and recordable characters 15. In accordance with the invention, recordable characters 15 are disposed in rows, each row for example being capable of recording a complete single line of recorded information. Although for the sake of clarity only two such rows are illustrated, it will be apparent that as many such rows as desired may be used. Similarly, although only a few characters 15 are shown in each row, it will be apparent that only one character or alternatively as many characters 15 as desired may be used in each row. The recording medium 20 is advanced, either intermittently or continuously, in a direction substantially normal or having a component normal to the lines of recorded information, in order to permit recording of additional lines of information. G designates a plurality of recording energy generators, each individual generator being designated as 21.

Basically the invention involves the recording of characters 15 onto medium 20 by employing electronic means to generate the actual recording energy in some form other than mechanical energy of components, thereby avoiding the speed limitations otherwise imposed by the inertia of mechanical components. Many of the specific embodiments are capable of recording characters 15 onto medium 20 in a variety of ways, as for example by the establishment of an electric, magnetic, electromagnetic radiant energy, or heat energy gradient at the surface of a recording medium sensitized to such gradients.

Figure 2:
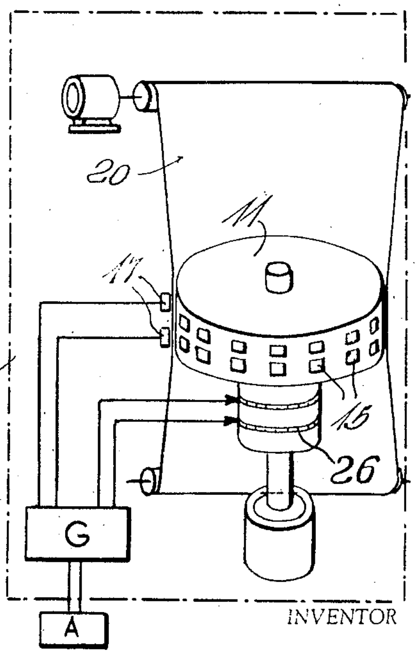
Fig. 2 is a front elevation illustrating one practical embodiment of the invention.

In Fig. 2 is illustrated one practical embodiment of the invention wherein the recordable characters 15 are disposed on the surface of a rotatable cylindrical element 11 in circumferential rows, and the movable recording medium 20 is caused to conform to a portion of the cylindrical surface of said element 11. Thus the line of recorded information is substantially at right angles to the axis of the cylinder. According to this embodiment, the characters 15 may, if desired, cooperate with a series of fixed elements 17 in such a manner that the characters 15 successively move past cooperative elements 17. Commutator means 26 are provided, related both to recordable characters 15 and the plurality of recording energy generators G. Recording medium 20 is disposed between characters 15 and elements 17. Any suitable means responsive to the control of sending station A may be provided to effect recording of a given related character 15 at the instant of its alignment with a cooperating element 17.

Figure 3:
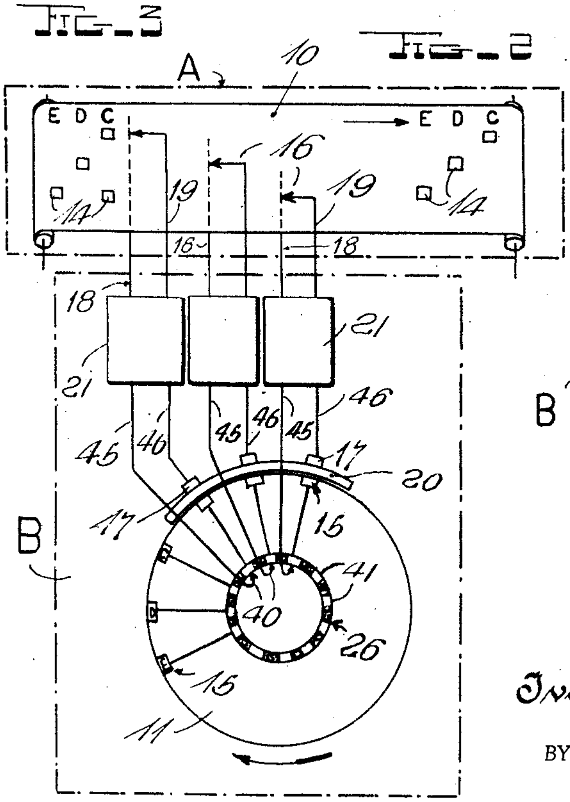
Fig. 3 is a diagrammatic view of the sending and receiving station mechanism shown in Fig. 2.

One such means is shown in Fig. 3, from which figure it will be observed that sending station A consists of a movable element 10 which carries coded storage elements 14 comprising in coded form the information to be recorded at station B. In this embodiment, the movement of movable element 10 is synchronized in any suitable, well known manner, as by synchronous motors, common mechanical linkage, or the like, with the movement of rotary element 11. The use of synchronous motors to effect such synchronized movement between elements 10 and 11 is illustrated, for example, in Figs. 1 and 3 of my Letters Patent 2,178,989, supra. Sensing elements 16 responsive to coincidence in position with coded elements 14 are provided and connected to individual recording energy generators 21 by leads 18 and 19. The outputs of respective generators 21, in turn, are connected by diagrammatic connection 45 through individual stationary brushes 40 and commutator segments 41 to related characters 15. Although the characters 15 may be of any desired shape, representative letters of the alphabet are shown spaced around the periphery of rotary element 11 at C, D and E, by way of illustration. Each such electrodic character may consist of a single conducting outline as shown at C, D and E on rotary element 11 of Fig. 3, or, alternately, may consist of a series of spaced conducting electrodes as shown at Z, for example, in Fig. 7, and as described in more detail hereinafter. Suitable electrodic characters are also described in my Letters Patent 2,248,522, supra. The commutator segments 41 and the brushes 40 are preferably made narrow in the circumferential dimension to insure accurate positioning of characters 15 at the instant of recording. Similarly each sensing element 16 and its related generator 21 may be connected to an individual cooperating element 17 by diagrammatic connection 46. The segments 41 constitute a commutator ring 26.

The embodiment shown in Fig. 3 is capable of several types of recording, utilizing electric, magnetic, or thermal gradients, etc. at the recording medium surface. For recording by electrostatic means, both cooperating element 17 and characters 15 are electrodic in nature, and recording medium 20 is selected to be responsive to an electrostatic difference of potential, created between a given electrodic character 15 and its related cooperating electrodic element 17 at the instant of recording by related recording energy generator 21. Although the establishment of an electric potential between a given electrodic character 15 and its related cooperating electrodic element 17 may under certain conditions be accompanied by a general type of current flow as disclosed in Letters Patents No. 2,178,989 and No. 2,248,522 and in my copending application Serial No. 407,378, the disclosure in the present instance is directed specifically to recording by the so-called displacement current or other electrostatic effect associated with a pulsed electrostatic potential difference between said characters and said cooperating electrodic elements.

Figures 4, 5, 6, 7, 8, 9:
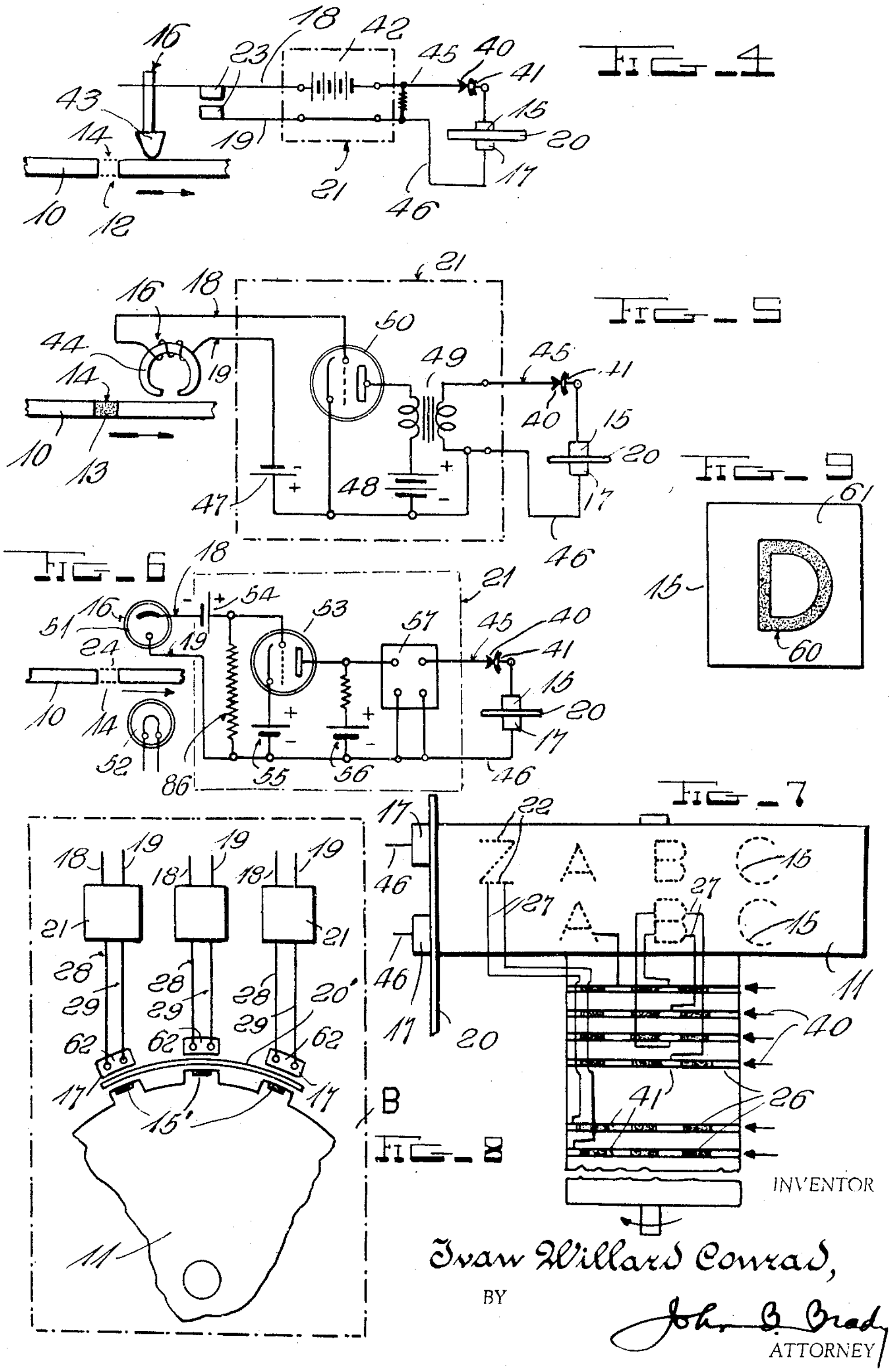
Fig. 4 is a diagrammatic view of a sensing control element and recording energy generator suitable for use in the embodiment shown in Fig. 3.
Figs. 5 and 6 are diagrammatic views illustrating alternative forms of sensing control elements and recording energy generators which may be used in lieu of the sensing element and generator shown in Fig. 4.
Fig. 7 is a side elevation of the receiving station mechanism diagrammatically illustrated in Fig. 3.
Fig. 8 is a detailed diagrammatic view of an alternative receiving station mechanism suitable for employment of magnetic or induction heating recording means.
Fig. 9 is a side elevation of a recordable character illustrated diagrammatically in Figs. 3 and 8.

In general the face of electrode 17 adjacent to medium 20 will be smooth and continuous over its entire area, whereas the face of electrodic character 15 adjacent to medium 20 in general will not be smooth or continuous, but will be shaped or otherwise constructed to concentrate the electrostatic field in the outline of the desired character, it being well known that electrostatic potential is greatest at points of greatest curvature, or at discontinuities in conductivity. In Fig. 9 is shown a representative electrodic character 15 wherein there is shown at 60 the outline of a representative symbol, the outline 60 having a different external electrostatic potential gradient from that of its background 61, as for example, as a result of differing conductivity, or differing curface shape.

Although other arrangements are readily possible, in the arrangement shown in Fig. 3 the alpha-numerical or other sequence of coded character storage elements 14 is disposed along the direction of travel of element 10, as at C, D, E, and the relative position of a given character in the line of recorded information is determined by the relative position of the corresponding storage element 14 along a line at right angles to the direction of travel of element 10. Thus activation of any given sensing element 16 by a coded storage element 14 corresponding to a desired character, as for example the letter C, will activate the corresponding recording energy generator 21 and will, by virtue of the substantially synchronous movement of elements 10 and 11, cause the character C to be recorded on medium 20 at a position in the line of recorded information corresponding to the sensing element activated. It will thus be observed that with the complete sequence of desired characters spaced around the periphery of rotating element 11, each such character will completely scan a given printing line, once per revolution of element 11. In this manner one complete line of printed information can be produced by each row of characters at each revolution of element 11, since each character can be recorded at any desired point in said line.

Fig. 4, 5, 6, and 18 illustrate respectively different alternative practical forms of sensing elements 16 together with appropriate cooperating coded storage elements 14, and appropriate recording energy generating means 21, suitable for use in the system shown in Fig. 3. Referring to the embodiment illustrated in Fig. 4, considered in relation to Fig. 3, movable sending element 10 is a relatively firm mechanical tape; coded storage elements 14 are indentations or perforations 12 in said element 10; sensing element 16 includes an insulating cam 43 mechanically linked to a pair of electric contacts 23 in such manner that when sensing cam 43 is riding on uncoded portions of element 10, contacts 23 are open, and when cam 43 is coincident with coded storage perforation 12, contacts 23 are closed; one of said contacts 23 is connected by leads 19 and 46 to an individual cooperating electrodic element 17; the other of said contacts is connected by lead 18 to an individual recording energy generator 21 which in this instance consists of a battery or similar source 42 of electrostatic potential. Potential source 42, in turn, is connected by lead 45 to recordable electrodic character 15 as described for Fig. 3. Recording medium 20 in this instance as indicated above is any material capable of being affected by electrostatic potential, and is situated between electrode 17 and electrodic character 15. Sensitized material suitable for such recording medium 20 is referred to in my Letters Patent 2,248,522, supra. Thus, movement of coded storage perforation 12 into coincidence with sensing cam 43 causes contacts 23 to close, thereby completing an electric potential circuit through potential source 42, to cooperating electrode 17, and electrodic character 15, and thereby recording electrodic character 15 onto medium 20.

Referring to the embodiment illustrated in Fig. 5, in relation to Fig. 3, movable element 10 in this instance is a tape suitable for the retention of magnetically recorded impulses, as for example any of the well known magnetic recording media presently commercially available; coded storage element 14 is a magnetic impulse 13 existing on movable element 10; sensing element 16 consists of a magnetic pickup head 44 of well known type suitable for the production of an electric voltage when activated by passage over magnetic pulse 13; recording energy generator 21 in this instance consists of an electronic vacuum tube 50, associated bias supply 47, plate supply 48 and output transformer 49. The pickup 44 is connected by lead 18 to the grid of tube 50 and by lead 19 through bias supply 47 to the cathode of tube 50. Tube 50 normally is biased substantially to cut-off by bias supply 47. Power supply 48 furnishes plate power to tube 50 through the primary of transformer 49. The output from generator 21 is taken from the secondary of transformer 49, which is connected by lead 46 to cooperating electrode 17, and by lead 45 to electrodic character 15 as described for Fig. 3. Thus tube 50 which is normally non-conducting is caused to become momentarily conductive as a result of passage of magnetic impulse 13 past pickup 44. This action results in the development of a potential across the secondary of transformer 49 and hence between electrode 17 and electrodic character 15, thereby recording character 15 on medium 20, medium 20 as before being responsive to displacement current or other electrostatic effect. While only a single amplifier tube 50 is shown for simplicity, it will be apparent to those skilled in the art that more than one such tube may be used, as for example a three or four stage amplifying system, in order to achieve additional gain between pickup 44 and transformer 49 if desired. Although the instant disclosure is directed primarily to recording by electrostatic or related effect on medium 20, it is obvious that this means is also effective either to record by direct contact conduction between electrode 17, medium 20, and character 15 as disclosed in Letters Patent No. 2,248,522 or alternatively by spark discharge through medium 20 between electrode 17 and electrodic character 15 as disclosed in Letters Patent No. 2,178,989 aforesaid, and as set forth in my copending application Serial No. 407,378.

Referring next to the alternative embodiment illustrated in Fig. 6, in relation to Fig. 3, movable element 10 is an opaque tape; coded storage elements 14 are perforations or otherwise transparent areas 24 existing on element 10; sensing element 16 includes a photoelectric cell 51 and a cooperating light source 52 positioned respectively on opposite sides of tape 10, whereby light from source 52 normally is prevented from reaching photo cell 51 by opaque element 10, but whereby the passage of coded storage element transparency 24 between source 52 and cell 51 permits the photo cell to be activated by light from source 52; photo cell 51 in turn is connected by leads 18 and 19 to the input of recording energy generator 21, which in this instance consists of an electronic keyer tube 53 together with associated power supplies 54, 55, and 56, and a keyed source 57 of high frequency high potential electric current. The high frequency output of source 57 is connected by lead 45 to electrodic character 15 as described for Fig. 3, and by lead 46 to cooperating electrode 17. Medium 20 placed between character 15 and electrode 17 is, as before, responsive to displacement current or other high potential effect. Thus, when photo cell 51 is activated by light from source 52 passing through coded transparency 24, keyer tube 53 which is normally biased to cut-off by bias supply 55 is rendered conductive in a well known manner through the action of supply 54 acting across grid resistor 86, thereby keying high frequency source 57 to produce a burst of high frequency potential between electrodic character 15 and cooperating electrode 17, and to record character 15 on medium 20. Here again although in the present disclosure directed primarily to displacement current recording or to recording by other related high potential effect on medium 20, it will be apparent that merely by proper choice of circuit constants and medium 20 this means is effective to record either by direct contact conduction between electrodic character 15 and medium 20 as disclosed in Letters Patent No. 2,248,522, or alternatively by high frequency corona discharge as disclosed in Letters Patent No. 2,178,989, and as set forth in my copending application Serial No. 407,378. A suitable high frequency generator for use as element 57 is shown in Letters Patent No. 2,178,989, and many others are well known in the art.

Figure 18:
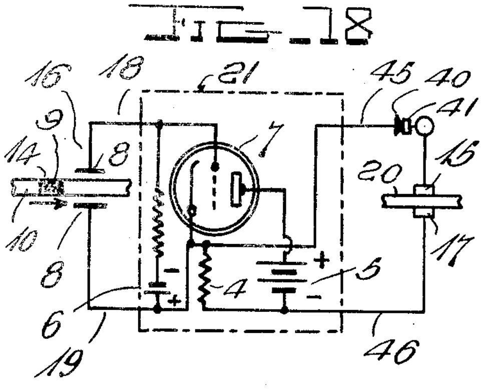
Fig. 18 is a diagrammatic view of a further alternative sensing control element and recording energy generator which may be used in lieu of the sensing element and generator shown in Fig. 4.

Referring next to the alternative embodiment illustrated in Fig. 18 in relation to Fig. 3, movable element 10 in this instance is an insulating material capable of receiving and storing electrostatic charges; coded storage element 14 is an electrostatic impulse 9 existing on movable element 10; sensing element 16 consists of an electrostatic pickup 8 for the production of a potential when activated by passage over electrostatic pulse 9; recording energy generator 21 in this instance consists of an electronic vacuum tube 7 with associated bias supply 6, plate supply 5, and cathode resistor 4. The pickup 8 is connected by lead 18 to the grid of tube 7 and by lead 19 to the cathode resistor 4. Tube 7 normally is biased to cut off by supply 6. Output is taken across cathode resistor 4, lead 46 going to related cooperating electrodic element 17 and lead 45 going to electrodic character 15 as described for Fig. 3. Thus tube 7 which is normally non-conducting is caused to become momentarily conductive as a result of passage of electrostatic impulse 9 past pick-up 8. This action results in the development of a potential across cathode resistor 4 and hence between electrode 17 and electrodic character 15, thereby electrostatically recording character 15 on medium 20. As in Fig. 5, only a single amplifying tube is shown for simplicity, although more may be used if desired.

Although in Figs. 4, 5, 6, and 18, each type of recording generator 21 is shown connected to only a specific type sensing element 16, it will be apparent to those skilled in the art that any of the various sensing elements 16 may be used with any of the recording energy generators 21, merely by minor circuit changes, and the specific types and interconnections shown are intended to be merely representative and not limiting.

Figure 10:
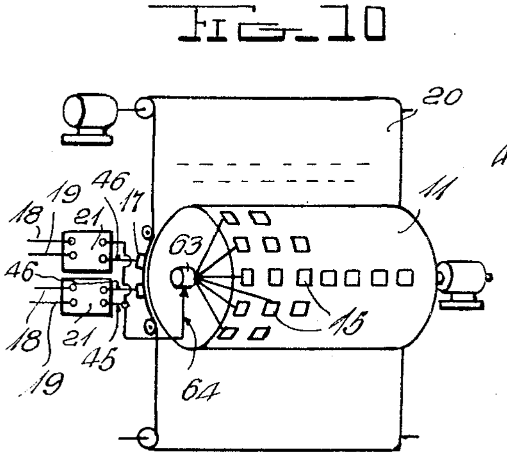
Fig. 10 is a partially perspective view of an alternative receiving station mechanism suitable for use with the sending station means illustrated in Fig. 3.
Figure 11:
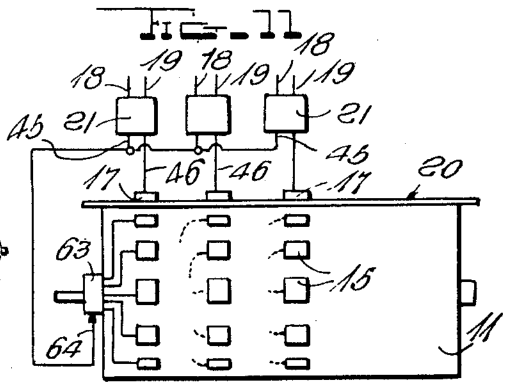
Fig. 11 is a plan view of the receiving station mechanism shown in Fig. 10.

In Figs. 10 and 11 there are illustrated two aspects of still another alternative embodiment of a receiving station mechanism suitable for use with the sending station means depicted in Fig. 3. Referring in detail to Figs. 10 and 11 it will be observed that according to this embodiment, the rows of recordable characters 15 are disposed on the cylindrical surface of a rotatable element 11 in such manner that the alphabets of desired symbols again form circumferential rows, but the lines of recorded information in this instance occur substantially parallel to the axis of the rotating element 11. The movable recording medium 20 is caused to conform to the cylindrical surface for the number of lines of recorded information desired to be recorded simultaneously. This embodiment, like that of Fig. 2 and Fig. 3, is also capable of several types of recording such as electrostatic, magnetic, heating, etc. For recording by electrostatic means, recordable characters 15 in this instance are each formed by a single continuous electrode, and all such characters are electrically connected to rotating contact 63. A plurality of recording energy generators 21 is provided, one for each character position in the final line of recorded information. Each such generator 21 is provided with input leads 18 and 19 for connection to suitable sending station means, as for example that shown in Fig. 3, and similarly each generator 21 is provided with output leads 45 and 46. Lead 46 runs from each generator 21 to an individual related cooperating electrode 17, the plurality of said electrodes 17 forming rows corresponding to the final lines of recorded information. All output leads 45 are joined by a common electrical connection to brush 64 which makes electrical contact with rotating contact 63. Recording medium 20 is responsive to displacement of electric current or other electrostatic effect, and as before, is situated between characters 15 and electrodes 17. Recording energy generators 21 suitable for use in this embodiment are shown in Figs. 4, 5, 6 and 18. Thus upon activation of a given generator 21, an electrical potential is created across medium 20 between the related electrode 17 and whatever character 15 that is in alignment with said electrode 17 at the instant of activation, thereby recording said character on said medium. Medium 20 is advanced by any suitable means after the recording of one or more lines of information, as for example through mechanical linkage with rotating element 11.

Figure 12:
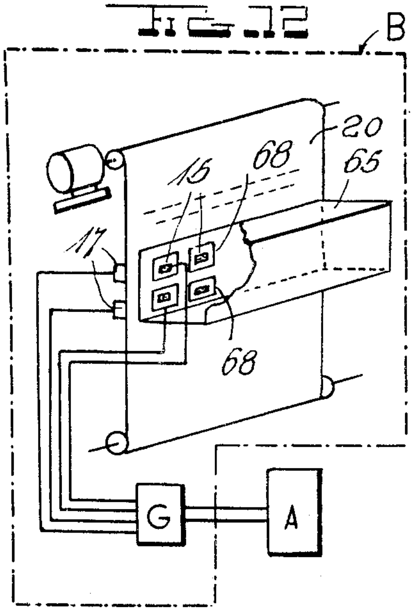
Fig. 12 is an oblique front elevation of still another embodiment of the invention in which non-synchronous means is used for selection of characters to be recorded.

The embodiments illustrated in Fig. 2 through Fig. 11 basically utilize synchronous distributing means at sending and receiving stations for selection of characters. However, other suitable non-synchronous means readily may be employed, as for example, the use of different frequencies, one for each character to be recorded, or alternatively, the use of a cathode ray relay or storage tube with contacts provided and connected to corresponding character recording means, whereby selection is accomplished through appropriate deflection of a cathode ray beam. Fig. 12 illustrates a practical embodiment of the invention, wherein the recordable characters 15 are disposed in parallel lines on the substantially plane surface of a character-holding stationary matrix 65, and the movable recording medium 20 is caused to conform to said plane surface, selection of characters at receiving station B being carried out by non-synchronous means under the control of sending station A. This embodiment like that of Fig. 3, and Fig. 10 is also capable of utilizing various forms of non-mechanical recording energy such as electrostatic, magnetic, heat, etc.

Figure 13:
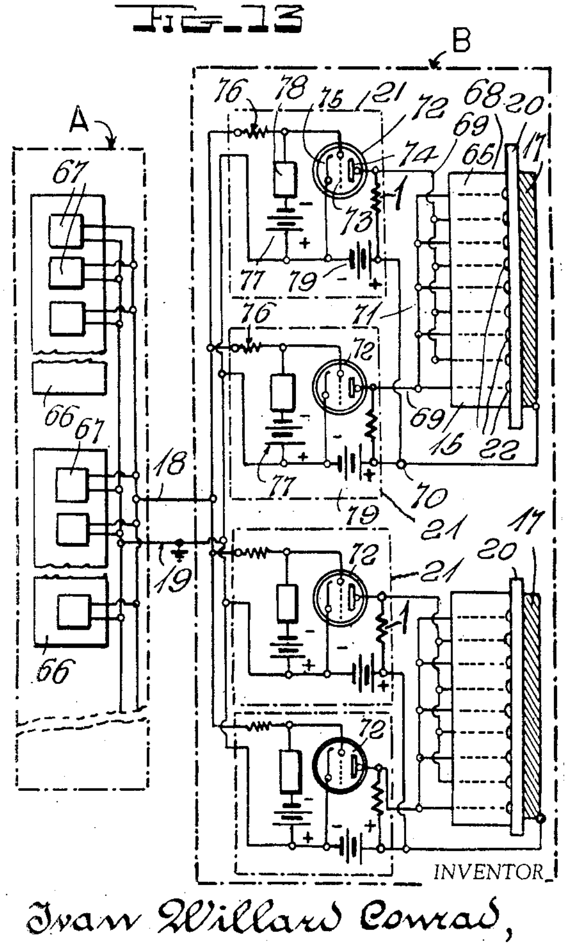
Fig. 13 is a detailed diagrammatic view of the sending and receiving station mechanism shown in Fig. 12.

Referring in detail to Fig. 13 wherein are shown diagrammatically detailed sending station means and detailed receiving station means including recording energy generators 21 and recordable characters 15 suitable for use in the embodiment illustrated in Fig. 12, A and B again represent sending station means and receiving station means respectively.

Sending station means A includes a plurality of alternating current signal generator banks 66, as many in number as there are different character positions 68 within matrix 65 of Fig. 12, each bank corresponding to a single position 68. Each signal generator bank 66 in turn includes a plurality of alternating signal generators 67, as many in number as there are individual characters 15 capable of being recorded at the corresponding character recording position 68. Each generator 67 operates on a different frequency and corresponds to a single recordable character 15. The outputs of all generators 67 are connected in parallel and fed to receiving station means B over leads 18 and 19. Receiving station means B, in turn, comprises a plurality of recording energy generators 21, one for each individual character 15 to be recorded. For electrostatic recording the output of each of said generators 21 is connected by lead 69 to an individual corresponding electrodic character 15, and by lead 70 to a cooperating electrode 17. The said generators 21 are arranged in groups, all such generators within a given group having their output circuits 69 connected to corresponding characters 15 within a single character position 68, and there being as many groups as there are different character positions 68. The recordable characters in this instance consist of elemental conducting areas 22 outlining and partially filling the form of the symbol to be recorded, all elemental areas 22 of any given character being connected together as at 71 and connected to a corresponding lead 69. Interspersed with and surrounding the elemental areas or electrodes 22 of any given character 15 are placed other elemental electrodic areas held in matrix 65 and connected in groups to outline all required characters, each group outlining an individual character 15 and being connected to a different corresponding recording energy generator 21.

Figure 14:
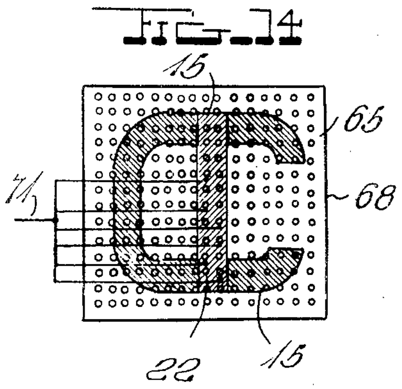
Fig. 14 is a side elevation of a portion of the character matrix shown in Figs. 12 and 13 comprising a single character recording position.

In Fig. 14 is shown one character recording position 68 containing one character 15 with elemental areas 22 connected as at 71 and the manner in which other required characters, only one of which is shown for the sake of clarity, are in effect superimposed in matrix 65, although comprising different electrodic elemental areas. The manner of operation of any single given recording position 68 of Figs. 13 and 14 is similar to that disclosed in my Letters Patent 2,248,522, aforesaid, in respect to character formation. The present disclosure makes possible the simultaneous use of a plurality of such positions to produce one or more simultaneous lines of printed material.

Referring again to Fig. 13, each recording energy generator 21 comprises a vacuum tube 72 having grid 73, plate 74, and cathode 75. The grid 73 is connected to input lead 18 through decoupling resistor 76 and the cathode 75 is connected to input lead 19. Bridged in series between said grid and cathode is bias supply 77 and band-reject filter 78. The plate 74 is connected through output lead 69 to a corresponding electrodic character 15, and by plate resistor 1 to plate supply source 79. Cathode 75 is connected through plate supply 79 to a corresponding cooperating electrode 17, the electrostatically sensitive recording medium 20 being placed between said electrode 17 and electrodic character 15. Tube 72 normally is biased to cut-off by bias supply 77. Band-reject filter 78 is designed to offer a high impedance to a narrow band of desired frequencies and negligible impedance to frequencies outside the desired band, the center and width of the desired band being chosen in such manner that filter 78 offers high impedance to the frequency of a single one of signal sources 67 in sending station A, and negligible impedance to the frequencies of all others of said sources 67. Thus upon activation of a given source 67 in any desired manner, as for example under the control of a manual keyboard, automatic tape transmitter, or high speed computing device, a signal of the individual frequency determined by the activated source 67 will be impressed upon circuit lines 18 and 19, and in turn between the grids 73 and the cathodes 75 of all tubes 72 contained in all recording energy generators 21. Because of the action of filters 78 and decoupling resistors 76, the amplitude of the signal effectively reaching grids 73 and cathodes 75 will be negligible for all generators 21 except one, namely the single generator 21 in which the filter 78 offers a high impedance to the impressed frequency. Hence in that generator alone, the plate-cathode impedance of tube 72 will be reduced below cut-off and plate 74, which has been maintained at the same high potential as electrode 17 by plate supply 79 acting through plate resistor 1, will therefore fall to a value lower than that of electrode 17, thereby establishing a potential difference across medium 20 between electrode 17 and those elemental electrodic areas 22 of character 15 connected to the lowered plate 74, and thereby recording on electrostatically sensitive medium 20 the individual character 15 corresponding to the activated signal source 67 in sending station A.

The position 68 of the recorded character 15 will of course depend upon the bank 66 in which activated signal source 67 was located at the sending station A. It will be apparent that as many of the recordable characters 15 as desired can be recorded simultaneously merely by simultaneous activation of the corresponding sources 67. Ordinarily some or all of the sending station banks 66 would be activated simultaneously, but only one source 67 in each bank would be so activated, thereby recording a single character only in each of the character recording positions 68.

While in Fig. 13 all signals between sending station A and receiving station B are shown passing over a single pair of wires 18 and 19, it will be apparent that an individual and different set of leads 18 and 19 can be provided for each given bank 66, each such different set of leads being connected only to that group of recording energy generators 21 corresponding to the given source bank 66. By thus increasing the number of circuits 18 and 19, the signals from any given bank 66 may be electrically separated from the signals of all other banks; hence, the frequencies of sources 67 in any given bank may be duplicated in all other banks, thereby reducing the number of distinct frequencies required to the highest number of different characters desired to be activated from any given bank 66 and correspondingly recorded in any given character recording position 68.

Figures 15, 17:
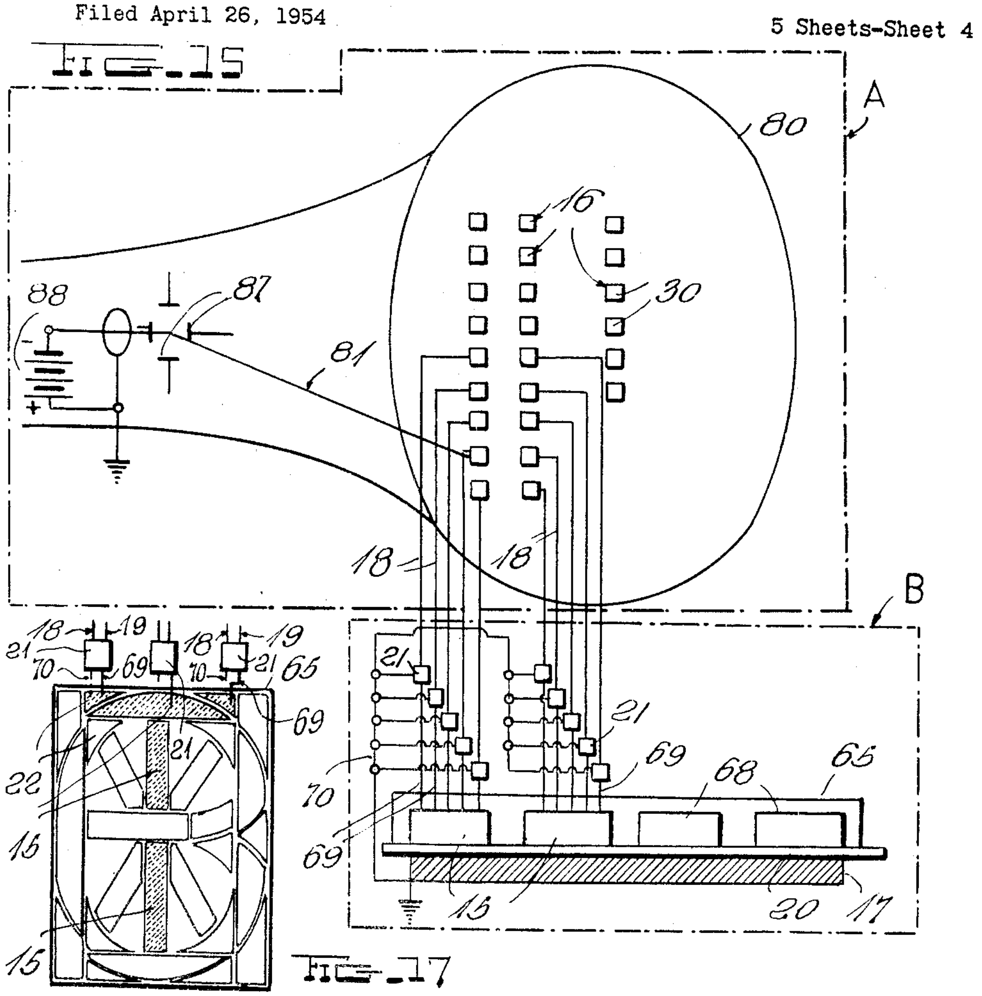
Fig. 15 is a diagrammatic view of an alternative sending and receiving station mechanism suitable for use in the embodiment illustrated in Fig. 12.
Fig. 17 is a diagrammatic view of an alternative character matrix suitable for use in Fig. 12.

Alternatively, as shown in Fig. 17, character matrix 65 may contain relatively large electrodic elements 22, each supplied by an individual recording energy generator 21, selectively grouped to form desired characters 15. Areas shaded indicate manner of such grouping. The operation of any single given recording position as shown in Fig. 17 is similar to that disclosed in my Letters Patent 2,248,522, aforesaid, with regard to forming a desired character outline. The present invention permits simultaneous use of a plurality of such positions for the instantaneous recording of one or more lines of material. The sending station means A of Fig. 13 consisting of a plurality of alternating current signal generators 67, and the recording energy generators 21 of Fig. 13 are directly applicable for use with the character matrix of Fig. 17, the only variation being in the manner of grouping. Thus, for example, each signal source 67 when activated will result in the energizing of a single recording energy generator 21 as described for Fig. 13, and hence, in the energizing of the corresponding single element 22 of Fig. 17. Accordingly, any desired character 15 of Fig. 17 may be selected and recorded by activation of the specific plurality of sources 67 corresponding to the plurality of elements 22 making up the desired character. Such activation of sources 67, as before, may be controlled in any desired manner, as for example, by manual keyboard, automatic tape transmitter, high speed computing devices, and the like. The development of an electrostatic potential across electrostatically sensitive medium 20 between the plurality of elements 22 comprising a single character 15 of Fig. 17 and a cooperative electrode 17, in the manner described in connection with Fig. 13, will thus record the outline of the said character 15 on said medium 20.

Figure 16:
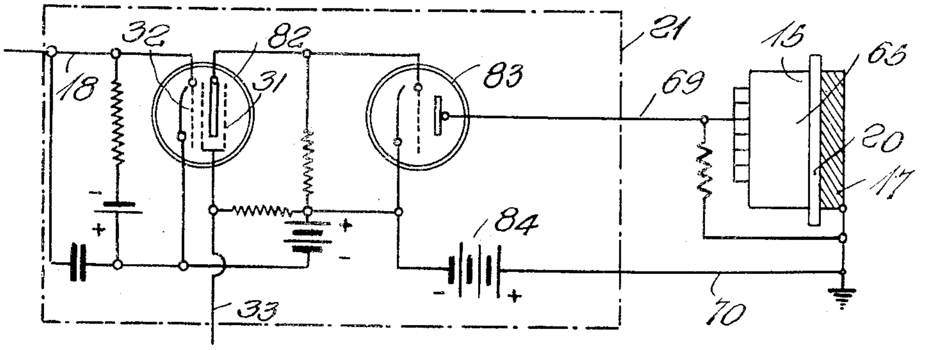
Fig. 16 is a diagrammatic view of the recording energy generator and electrodic characters illustrated in Fig. 15.

In Fig. 15 is shown still another practical embodiment of the invention in which a special cathode ray tube is used as the non-synchronous means of character selection. Referring in detail to Fig. 15, there is shown at 80 a special cathode ray tube having on its face sensing elements 16 responsive to activation by cathode ray pencil 81. Although the sensing elements 16 might take a variety of forms, as for example the form of a capacitor whose charge is affected by the cathode beam, in the present instance for the sake of clarity sensing elements 16 are considered to consist of individual metallic contacts 30, by means of which the negative potential of the cathode beam itself with respect to ground is made directly available at the contact surface when said contact 30 is struck by the impinging cathode ray pencil 81. A separate sensing element 16 is provided for each character to be recorded in each position 68 in the matrix 65, and the elements 16 preferably are arranged in groups, as for example vertical columns, in such manner that all such sensing elements 16 corresponding to the complete symbol alphabet to be recorded at any given recording position 68 are in the same group (column) and a separate group is provided for each separate character recording position 68. Each sensing element 16 is connected by circuit 18 to a corresponding, individual recording energy generator 21, and the various generators 21 are likewise arranged in groups, each group corresponding to an individual recording position 68. The output of each generator 21 is connected by lead 69 to its respective electrodic character 15 and by lead 70 to a cooperating electrode 17. Recording medium 20, in this instance responsive to so-called displacement current or other electrostatic effect, is situated between characters 15 and electrodes 17. One form of recording energy generator 21 and associated character recording means suitable for use in the embodiment illustrated in Fig. 15 is shown in detail in Fig. 16, wherein generator 21 consists of a 2 stage directly coupled vacuum tube amplifier comprising tubes 82 and 83 together with their associated bias and plate power supplies. Tube 82 is normally in a conducting state and circuit constants are so chosen as to make tube 83 in a normally non-conducting state. Thus when a given sensing element 16 is activated by the impingement thereon of cathode beam 81, under the control of a manual keyboard, automatic tape transmitter, high speed computing device or the like, the grid of corresponding tube 82 is driven more negative by virtue of its connection 18 with said sensing element. Through the well known action of a two stage direct-coupled amplifier, the grid of tube 83 is made less negative with respect to its associated cathode and tube 83 therefore becomes conducting whereupon power supply 84 establishes an electrostatic potential difference across electrostatically sensitive medium 20, between electrode 17 and electrodic character 15 in a similar manner as described for Fig. 13, thereby recording character 15 on medium 20. Characters 15 in this instance are similar in nature to the characters shown in detail in Fig. 14.

In addition, those skilled in the art will recognize that in the case of the embodiment illustrated in Fig. 15, under suitable conditions, as for example, where the interconnecting circuits 18 are not unduly long, the energy transmitted to receiving station B over circuits 18 by cathode ray 81 can be made sufficiently great as to be itself capable of exciting electrodic characters 15 directly, without the assistance of intermediate generators 21. In such a case, each generator 21 in Fig. 15 would degenerate into a straight-through connection from a given lead 18 to its corresponding lead 69 (and output leads 70 would not exist). Thus upon the impingement of cathode ray 81 upon a given sensing element 16 under the control of a manual keyboard, automatic tape transmitter, high speed computing device, or the like, driving deflection means 87, cathode ray power supply 88 would establish a character-recording electrostatic potential (through cathode ray 81, sensing element contact 30, lead 18, and related lead 69) on related electrodic character 15, across electrostatically sensitive recording medium 20, with respect to cooperating electrode 17 and the common return circuit or ground, thereby recording said character 15 onto medium 20.

With further reference to Figs. 2 through 7 and Figs. 12 through 18, it is noted that the electric circuit includes electrodic characters 15 on one side of the recording medium 20 and a cooperating electrode 17 on the opposite side of said medium, thereby developing the recording potential gradient between the two surfaces of the medium. It will be readily recognized by those familiar with the art that the necessary potential gradient may be developed between two points on the same side of the recording medium without departing from the spirit and scope of the present invention. For example, referring to Fig. 24, there are shown representative character elements 22 suitable for use in the embodiments of Fig. 12 through 17, wherein electrical connection 69 from generator 21 goes directly to elemental area 22 as before, but wherein connection 70 from generator 21 goes to an electrodic area 91 on the same side of medium 20, rather than to an electrodic area 17 on the opposite side of medium 20. The matrix 65 itself can, for example, comprise the electrodic areas 99, insulated of course from elements 22. Thus upon activation of a given electrical recording generator 21 in any manner as described earlier in connection with Figs. 12 through 17, an electrical potential difference will be developed between related elements 22 and the surrounding electrodic areas 91; this potential gradient in turn will affect the immediately adjacent areas of sensitized medium 20, thereby recording on medium 20 the outlines of elemental areas 22, and the characters 15 comprising said elemental areas. Similar circuit changes are obviously possible in the embodiments of Figs. 2 through 7.

The embodiments thus far described in the present specification have related to electronic recording by electric potential gradient affecting the recording medium 20, and more particularly to the so-called electrostatic effect of such gradients as distinguished from current flow effects. However, it will be noted, as pointed out earlier, that the production of an electric potential difference between electrodic characters 15 and cooperating electrodic element 17 under the proper conditions may be caused to create an actual current flow between said character 15 and said electrodic element, as for example under the conditions outlined in Letters Patent No. 2,178,989 and No. 2,248,522 aforesaid and in my copending application Serial No. 407,378.

As is well known to those skilled in the art, such a flow of electric current is accompanied by the production of a magnetic field in the immediate vicinity of the current flow. Accordingly, I may utilize this magnetic field effect for the recording of characters 15 onto medium 20, by choosing medium 20 of a material responsive to such magnetic field and of such conductivity as to permit a current flow under the potential-gradient-producing conditions disclosed herein. The circuits and embodiments disclosed in Figs. 2 through 6 and Figs. 9 through 18 and Fig. 24 are directly applicable to such magnetic recording without change other than suitable choice of medium 20 to meet the conductivity and magnetic sensitivity requirements, and such recording media are readily available commercially at the present time.

Although for so-called electrostatic recording it is generally satisfactory for each character 15 to consist of a single electrodic outline of the desired character, each character may consist of more than one electrode; however, for magnetic recording utilizing the field surrounding a current flow as described immediately above, particularly in the embodiments reflected in Figs. 2, 3, 4, 5, 9, 10, and 11, although some or all of the characters 15 may comprise only a single electrode for cooperation with electrode 17, it is preferred that said characters, except in the cases of such of the same as are relatively small, as commas, periods, and the like, shall be comprised by a plurality of electrodes designated as 22, as shown in Fig. 7, and that the recording currents between the electrode 17 and the different electrodes 22 shall be distinct from each other, thereby to assure recording of the complete outline of said characters 15. Accordingly, referring in detail to Fig. 7, wherein is shown a detailed view of the receiving station mechanism illustrated diagrammatically in Fig. 3, it will be observed that rotating element 11 carries a plurality of commutator rings 26; that there are separate connections 27 between the electrodes 22 comprising any given character 15 and corresponding commutator segments 41 in the plurality of commutator rings 26; and that for each character position in the final line of recorded material, there is an axial series of cooperating fixed brushes 40, one brush for each commutator ring. Of course, some of the characters may be comprised by a greater or lesser number of electrodes 22 than others of said characters. Accordingly, there are as many of the commutator rings as the maximum number of electrodes 22 in any given character 15, so that each electrode of each character may have a connection 27 with a distinct commutator ring. Thus all of the rings 26 may be utilized to provide separate connections for electrodes 22 of certain of the characters 15, and only some of said rings may be utilized to provide separate connections for the electrodes 22 of others of said characters, depending of course upon the number of electrodes 22 comprising the individual different characters 15. It will further be observed that as illustrated in Fig. 7, a separate row of recordable characters 15, a separate series of commutator rings 26, and a separate row of cooperating electrodes 17 are provided for each line of recorded information which it is desired to record during the same rotation of element 11; while only two such lines are provided for in Fig. 7, it will be apparent that only one might be provided or that more than two might be provided as stated earlier.

Referring again to Fig. 3 in relation to Fig. 7, there is a recording energy generator means 21 individual to each of the brushes 40 to assure a separate current between electrode 17 and each of the electrodes 22 comprising the character being recorded. Since, however, said generator means 21 are, or may be duplicates of one another, only a few of the same have been illustrated for the sake of clarity and to avoid complicating the illustration.

It is apparent that any suitable means may be used to advance the recording medium 20, as for example mechanical linkage synchronized with the rotation of rotatable element 11, such as a pawl and rachet or other appropriate mechanism.

With regard to the embodiments of Figs. 10 and 11 it is noted that while only characters 15 of single electrode type are shown, it will be apparent that characters formed by a plurality of electrodes may be readily employed in this mechanical embodiment by appropriate circuit modifications similar to those described in connection with Fig. 7.

While the flow of electric current through the recording medium between electrodic characters and cooperating electrodic means, as disclosed generally in Letters Patent No. 2,178,989, and No. 2,248,522 aforesaid, is effective to record said characters magnetically through proper choice of a recording medium responsive to the magnetic field associated with such flow of electric current, as specifically recited above, the establishment of the necessary magnetic field gradient to record desired characters magnetically may be accomplished in other ways.

Figure 19:
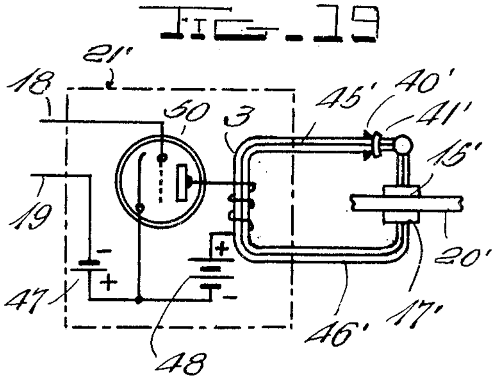
Fig. 19 is a diagrammatic view of a recording energy generator and associated circuits suitable for production of magnetic flux as recording energy, in lieu of electrical energy.

For example, referring again to Figs. 2 through 7 and 9 thru 18 and Fig. 24, it will be recognized by those skilled in the art that in lieu of the electric path shown from generators 21 through diagrammatic circuits 45 and 46, or circuits 69 and 70 to characters 15 and cooperating electrodes 17, I may substitute a corresponding magnetic circuit wherein recording energy generators 21 are chosen to generate magnetomotive force, and wherein diagrammatic paths 45 and 46, or paths 69 and 70, as well as brushes 40, commutator segments 41 and related paths leading to recordable characters 15 and cooperating elements 17 are chosen of a material having low magnetic reluctance for the effective transmission of the magnetic flux caused to flow through such magnetic circuit by magnetic generators 21. Recording medium 20 again is chosen to be responsive to the flow of magnetic flux. For example, in Fig. 19 is shown a suitable generator 21′ for the production of magnetic flux, all components therein being identical to those shown and described for Fig. 5 except that an electromagnetic transducer 3 has been substituted for the output transformer 49 of Fig. 5 and 45′ and 46′ represent the magnetic output circuits feeding magnetic connections 40′, 41′, magnetic characters 15′, magnetic cooperating element 17′ and magnetically sensitive medium 20′. Thus upon excitation of a given generator 21′ under the control of a related sensing element 16 in a manner as described for Fig. 3, the said magnetomotive force generator 21′ will momentarily force a flow of magnetic flux over magnetic circuit 45′ to magnetically recordable character 15′, through magnetically sensitive medium 20′ and back to generator 21′ by way of cooperating magnetic element 17′ and path 46′, thereby magnetically recording said character 15′ on said medium 20′. Similar substitution of magnetic for electric output paths may be made specifically in Figs. 2, 3, 4, 6, 7, 9, 10, 11, 12, 13, 14, 15, 16, 17, 18 and 24 merely by similar choice of magnetomotive force generators 21′ and related magnetic-flux-conducting output paths from said generators 21′ acting on magnetically sensitized medium.

It will further be recognized that the recording circuit from generators 21 through medium 20 may be electric in nature for part of the output circuit and magnetic for the remainder of the output path. Thus, referring to Fig. 20, there is shown a magnetically recordable character 15′ suitable for mounting in the rotatable element 11 of Figs. 2 and 3, wherein the leads 45 and 46 are electric circuits which may be driven by any of the electric recording energy generators 21 shown in Figs. 4, 5, 7 and 18, and wherein this electric recording energy is converted to magnetic recording energy by electromagnetic transducer 2, excited from leads 45 and 46 through related electric commutator brushes 40 and commutator segments 41. Since the magnetic flux emanating from the face of magnetically recordable character 15′ impinges directly on magnetically sensitive medium 20′ to record said character, cooperative magnetic element 17′ is not essential but may be used, if desired, to decrease magnetic reluctance of overall magnetic circuit. A suitable magnetically recordable character 15′ for use in the substituted magnetic circuits described is shown in Fig. 21 wherein there is shown at 60′ an outline of a representative symbol and at 61′ the background of said outline, the outline 60′ having a different magnetic reluctance or permeability from that of its background 61′.

While the methods outlined immediately above are effective in establishing the necessary magnetic field or magnetomotive force gradient to record desired characters magnetically, I prefer to use the circuit modification shown in Fig. 8 for this purpose. In the embodiment shown therein, a plurality of recording energy generators 21 is provided, each with input leads 18 and 19, suitable for activation by appropriate sensing means, as for example any of the sensing means 16 described in connection with Figs. 3, 4, 5, 6 and 18. The output leads 28 and 29 from each generator 21 are connected to an individual cooperative printing element 17 which in this instance takes the form of an electromagnetic 62 suitably shaped and sized as to illuminate with a magnetic field, when activated by the related generator 21, that area of magnetically sensitive recording medium 20′ immediately adjacent to said electromagnet 62 and approximately the size of a single character 15′. Any of the recording energy generators described in connection with Figs. 4, 5 and 18 are suitable for activation of an electromagnet 62. Recordable characters 15′ in this instance again are disposed in circumferential rows around the periphery of rotating receiving station element 11, and each character 15′ consists of an outline of the desired symbol, which outline is distinguishable from its background by a difference in magnetic reluctance or permeability as described in connection with Fig. 21.

Referring again to Fig. 8 it will be observed that there is provided an individual electromagnet 62 for each character position in the final line of recorded information. Thus upon excitation of a given generator 21 and its related electromagnet 62, under the control of a related sensing element 16 in a manner similar to that discussed in connection with Fig. 3, the said electromagnet will illuminate with magnetic flux the immediately adjacent area of magnetically sensitive recording medium 20′ and, through medium 20′, that recordable character 15′ which at the instant of excitation is aligned with said electromagnet 62. Because of the differing magnetic reluctance of character outline 60′ in contrast with its background 61′, the magnetic flux traversing medium 20′ will be correspondingly modified or concentrated and a recording of said character 15′ will thereby be effected on the magnetically sensitive medium 20′, at the position determined by the individual electromagnet 62. It will be noted that no electrical or magnetic circuit connections are required to rotating element 11 in this embodiment, in contrast to the plurality of such connections to rotating element 11 required in the embodiments illustrated in Figs. 3, 4 , 5, 6, 7, 10 and 11. It will be further noted that the magnetic reluctance of the overall magnetic circuit comprising any given electromagnetic 62 and character 15′ may be minimized by choice of pole shape and materials constituting the various parts of the magnetic circuit involved.

The embodiments thus far described in the present specification have related to electronic recording by the effect of electric potential gradients or magnetic field gradients acting on suitably sensitized recording media. However it will also be recognized that under certain conditions an electric or magnetic potential gradient can produce a temperature gradient in any material where the electric or magnetic field energy is being dissipated as heat energy. Accordingly I may use this general thermal aspect of electric and/or magnetic field energy for the recording of desired characters onto a suitably temperature-sensitized medium.

Thus the electric circuits and embodiments disclosed in Figs. 2 through 7 and Figs. 9 through 18 and Fig. 24 are directly applicable to such electronic thermal recording without any change whatever other than the suitable choice of recording medium 20 of a material responsive to temperature gradients and of such electric conductivity as to permit a heat-generating electric current flow under the potential-gradient-producing conditions disclosed in connection with the said figures. Referring illustratively to Fig. 3, upon activation of any given electric-potential-producing recording generator 21 by the coincidence of a coded storage element 14 with the related sensing element 16, there will be produced an electric potential across medium 20 between the corresponding cooperative electrodic element 17 and the electrodic character 15, as previously described in connection with Fig. 3. For electronic thermal recording, medium 20 therefore is made somewhat conductive with a resulting electric current flow and consequent generation of heat energy. This localized generation of heat energy produces a character-outlining temperature gradient in the temperature sensitive medium 20, thereby recording character 15 onto medium 20. It will now be obvious that electronic thermal recording as described for Fig. 3 is equally applicable to the circuits and embodiments of Figs. 2, 4, 5, 6, 7, 9, 10, 11, 12, 13, 14, 15, 16, 17, 18 and 24. With specific reference to Fig. 6, it will be recognized that in addition to heating of medium 20 by conductive flow of current, heatng may also be produced by the so-called "displacement" current in an otherwise normally non-conductive medium 20, since the output of recording energy generator 21 of Fig. 6 is high frequency alternating potential.

The use of specific thermal effects resulting from resistive electric energy dissipation under the conditions outlined in Figs. 2 through 7 and Figs. 9 through 18 and Fig. 24 constitute an improvement over the general effect of electric current flow disclosed in Letters Patents No. 2,178,989 and No. 2,248,522 aforesaid.

Alternatively to the utilization of electronic heating by the application of an external electric potential to a somewhat conductive recording medium as just described, I may use the electronic heating effect of a varying magnetic field for the development of the necessary recording-temperature-gradient in the recording medium. The embodiment shown in Fig. 8 is directly applicable to recording by such induction thermal effect, by proper choice of recording energy generator 21, electromagnet 62, medium 20, and recordable characters 15. Thus as described before, a given generator 21 energizes the related electromagnet 62 under the control of sending means over leads 18 and 19. For induction thermal recording, the generators 21 are chosen similar to that shown in Fig. 6, whereby electromagnets 62 are energized by a high frequency alternating current; electromagnets 62 in turn are designed to illuminate the adjacent portions of medium 20 and aligned characters 15 with a corresponding high frequency magnetic induction field. Characters 15 are chosen as shown in Fig. 21 to have outline 60′ and background 61′ of differing magnetic reluctance whereby the induction field traversing medium 20 of Fig. 8 is distributed according to the outline of the desired character. Accordingly, by choosing medium 20 of a conductive, heat sensitive material, the high frequency magnetic induction field develops in medium 20 a localized temperature gradient outlining the desired character, thereby recording said character on said medium. On the other hand, with electromagnets 62 illuminating medium 20 and characters 15 with a high frequency magnetic induction field as just described, I may choose medium 20 merely to be temperature sensitive (without being electrically conductive) and then choose characters 15 as shown in Fig. 9 where symbol outline 60 may have different electrical conductivity from that of its background 61. There will thus be induced directly in the character itself by the induction field from element 62 a temperature gradient outlining the desired symbol. This temperature gradient in the character itself may act directly on temperature sensitive medium 20 to record thereon the desired character, either by direct contact heat conduction, or by radiation to said medium.

The use of the high frequency magnetic field, as described above represents an improvement in the basic use of electromagnetic field for character recording as disclosed generally in Letters Patent No. 2,178,989 aforesaid.

As a further alternative, I may use electronic heating of the recordable characters by electrical energy dissipation within the characters themselves, for electronic thermal recording of desired characters. For example, there is shown in Fig. 22 a thermally recordable character 15 suitable for mounting in the rotatable element 11 of Figs. 2 and 3, wherein the leads 45 and 46 are electric circuits which may be driven by any of the electric recording energy generators 21 shown in Figs. 4, 5, 6, and 18, and wherein this electric recording energy is converted directly to thermal energy by resistive dissipation in conductive symbol outline 90, thereby establishing at the face of character 15 a temperature gradient outlining said symbol. Electrical recording energy is supplied from leads 45 and 46 to characters 15 by means of related brushes 40 and commutator segments 41. Cooperative elements 17 are not required in this embodiment. Thus upon activation of a desired character 15, the thermal temperature gradient existing momentarily on the face of said character will affect, either by conduction or radiation, temperature sensitive recording medium 20, thereby recording said character on said medium.

In a similar manner, thermal recording of desired characters in the embodiments of Figs. 12 through 17 readily may be accomplished merely by choice of a temperature sensitive recording medium 20 and choice of resistive, conductive elemental areas 22 (of characters 15) such that both the electrical circuits 69 and 70 are made directly to resistive elements 22. For example there are shown in Fig. 23 representative resistive character elements 22, suitable for use in the embodiments of Figs. 12 through 17, wherein electrical connection 69 from generator 21 goes directly to elemental area 22 as before, but wherein connection 70 from generator 21 goes also directly to element 22, rather than to cooperative electrode 17 as before. Cooperative electrode 17 therefore is no longer required in the disclosure shown in Fig. 23. Thus upon activation of a given electrical recording generator 21 in any manner as described earlier in connection with Figs. 12 through 17, an electrical potential and corresponding current flow will be caused through related elemental areas 22 of Fig. 23. As a result, said areas 22 will be momentarily heated by resistive energy dissipation, thereby establishing a temperature gradient outlining the elemental areas involved, and thereby recording on temperature sensitive medium 20 said elemental area outlines. As stated earlier, this method is directly applicable either to characters of the type represented in Fig. 14 or to those disclosed in Fig. 17.

While the circuits shown in Fig. 13 through Fig. 17 make the activation of recording energy generators 21 responsive, only to signals coming over circuit 18, and thereby make the printing of a desired character occur substantially instantaneously with the activation of the related generator 21 over lead 18, it will be apparent to those skilled in the art that, in lieu thereof, additional "recording trigger" means may be provided whereby the actual recording of a given character may be delayed until all desired characters forming any given line of recorded information have been selected by the selecting means shown and the corresponding circuits 18 appropriately energized, after which all of the desired characters may be printed simultaneously through appropriate activation of said "trigger" means by a "printing" pulse derived in any suitable manner from sending station A. One such suitable "trigger" means could be derived from control of a second, or screen, grid 31 in vacuum tube 82 whereby said screen grid maintained tube 82 in a conducting state, in spite of the increased negative potential on control grid 32 resulting from activation of the related sensing element 16, until the potential of said screen grid 31 is lowered by a negative "printing" pulse transmitted to said screen grid from sending station A over lead 33, at which time printing of the related character 15 would occur.

In addition, it will also be apparent to those skilled in the art that a combination of the synchronous and non-synchronous character selection means may at times be employed to advantage. For example the synchronous selection means illustrated in Fig. 3 and the non-synchronous means illustrated in Fig. 13 may be utilized together, whereby non-synchronous selection by frequencies is employed to select the position of the recorded character in the final line of information, and the synchronous means is utilized to select the specific character to be recorded in that position. Such a combination would possess the obvious advantage of permitting transmittal of the entire communications signal over a single circuit, as for example a single pair of wires, between the sending and receiving stations, and yet would not require the large number of individual frequencies otherwise required if the non-synchronous means were used for both selection of characters and recorded position.

Although not specifically shown in the drawings of the present application in the interests of simplicity and clarity, it will be recognized by those familiar with the art that additional commutator means may be included in those embodiments employing synchronous selection means, as for example Figs. 2, 3, 4, 5, 6, 7, 8, 10, 11, 18, 19, 20, and 22, whereby the precise alignment of characters 15 may be further governed, if desired, in the manner disclosed in Letters Patent No. 2,178,989 and No. 2,248,522, specific reference being made to commutator contacts 23 and brushes 24 of said patents. It will be further apparent that such commutating means does not necessarily have to be electric-contact in nature, but may consist of any desired method of on-off keying of energy, as for example magnetic or photoelectric keying.

While the drawings illustrate wire connections between the sending and receiving mechanisms A and B, it is manifest that such connections may readily be replaced by suitable electromagnetic or radio transmitting and receiving devices associated with the sending and receiving mechanisms A and B, respectively, and that it accordingly is within the purview of the invention to employ such devices if desired. Moreover, while only certain specific embodiments of the invention have been illustrated and described to convey the general concept of the invention, it is to be understood that the same is readily capable of various other embodiments within its spirit and scope as defined in the appended claims.

What I claim as new and desire to secure by Letters Patent of the United States is:

1. In a telegraph system, a receiving station page-printer mechanism including a sensitized page-style recording medium; a plurality of character-recording positions spatially disposed along at least one line traversing said medium; primary character-forming means operable under substantial gas pressure, defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including at least one from the group consisting of magnetic, thermal, and electrostatic energy gradients; means for advancing said medium in a direction substantially at right angles to said line of character-recording positions; and means controlling said recording energy and selection of characters to be recorded.

2. A telegraph system as set forth in claim 1 in which the said primary character-forming means and the said character-recording positions, and the said character-selecting means have a constant interrelationship with respect to accelerated physical motion during the selection and recording of said characters within any one of said lines of said character-recording positions.

3. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including at least one from the group consisting of magnetic, thermal, and electrostatic energy gradients; means for advancing said medium in a direction substantially at right angles to said line of character-recording positions; and means controlling said recording energy and selection of characters to be recorded to effect selection and recording of a plurality of said characters within a time interval which is substantially less in duration than the sum of the lengths of the individual time intervals required to select and record each individual character comprising said last-named plurality.

4. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including at least one from the group consisting of magnetic, thermal, and electrostatic energy gradients; means for advancing said medium in a direction substantially at right angles to said line of character-recording positions; and means controlling said recording energy and selection of characters to be recorded, whereby the individual time intervals required for selection and recording of individual characters may overlap in duration, thereby reducing the length of the total time interval required for selecting and recording a plurality of said characters along said line to a value substantially less than the sum of the lengths of the individual time intervals represented by the characters comprising said last-named plurality.

5. A telegraph system as set forth in claim 4 in which the said recording energy gradients acting on the said medium are electrostatic field gradients.

6. A telegraph system as set forth in claim 4 in which the said recording energy gradients acting on said medium are magnetic field gradients.

7. A telegraph system as set forth in claim 4 in which the said recording energy gradients acting on said medium are thermal energy gradients.

8. A telegraph system as set forth in claim 4 in which the said recording energy gradient is a high frequency magnetic induction field gradient.

9. A telegraph system as set forth in claim 4 in which said means controlling recording energy and selection of characters includes a sending station mechanism comprising a two dimensional matrix surface containing a plurality of discrete coded storage elements and further comprising a plurality of sensing elements movably positioned adjacent to said matrix surface; and in which said recordable characters and said recording positions are so related to said storage elements and said sensing elements that selective coincidence of one of said storage elements with one of said sensing elements uniquely relates a certain one of said characters to a certain one of said character-recording positions.

10. A telegraph system as set forth in claim 4 in which said means controlling recording energy and selection of characters includes a sending station mechanism comprising a plurality of discrete signal generators, each such generator being uniquely related to a corresponding one of said recordable characters; and in which said character-selecting means includes a plurality of recording energy generators, each uniquely related to a certain one of said recordable characters and responsive to activation by a certain one of said sending station generators to record the character uniquely related to said last-named certain one of said sending station generators.

11. A telegraph system as set forth in claim 4 in which the said means controlling recording energy and selection of characters includes a cathode-ray sending-station means comprising a cathode ray and a plurality of cathode ray targets each of said targets being uniquely related to a corresponding one of said recordable characters whereby said corresponding one of said recordable characters is recorded whenever said cathode ray strikes the uniquely related cathode ray target.

12. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including at least one from the group consisting of magnetic, thermal, and electrostatic energy gradients; means for advancing said medium in a direction substantially at right angles to said line of character-recording positions; and means controlling said recording energy and selection of characters to be recorded, whereby the individual time intervals required for selection and recording of individual characters may overlap in duration, thereby permitting selecting and recording a plurality of said characters along said line within substantially the same time interval length as the average time interval length required to select and record a single said character.

13. A telegraph system as set forth in claim 12 in which the said recording energy gradient is a high frequency magnetic induction field gradient.

14. In a telegraph system, a receiving station page-printer mechanism including a sensitized page-style recording medium; a plurality of character-recording positions spatially disposed along at least one line traversing said medium; primary character-forming means operable under substantial gas pressure, defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including at least one from the group consisting of magnetic, thermal, and electrostatic energy gradients; means for advancing said medium in a direction substantially at right angles to said line of character-recording positions; and means controlling said recording energy and selection of characters to be recorded; said primary character-forming means having a constant relationship to said character-recording positions with respect to accelerated physical motion during the selection and recording of said characters within any one of said lines of said character-recording positions.

15. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including electrostatic energy gradients; means for advancing said medium in a direction substantially at right angles to said line of character-recording positions; and means controlling said recording energy and selection of characters to be recorded, whereby the individual time intervals required for selection and recording of individual characters may overlap in duration, thereby permitting selecting and recording a plurality of said characters along said line within substantially the same time interval length as the average time interval length required to select and record a single said character.

16. A telegraph system as set forth in claim 15 in which the said recording energy gradients are produced between points located on opposite sides of the recording medium.

17. A telegraph system as set forth in claim 15 in which each of the said characters comprises a plurality of separate elemental areas connected together and further connected to a separate recording-energy-gradient producing means individual to each character, the elemental areas comprising each character being separate and distinct from the elemental areas comprising each other character, and certain of the elemental areas comprising certain of said characters being disposed within the outlines of certain other of said characters.

18. A telegraph system as set forth in claim 15 in which each of said characters comprises a plurality of separate elemental areas, said elemental areas having an interfitting relationship to each other so that certain of the said elemental areas are common to different characters, and in which each of said elemental areas is connected to a separate recording-energy-gradient producing means.

19. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including magnetic energy gradients; means for advancing said medium in a direction substantially at right angles to said line of character-recording positions; and means controlling said recording energy and selection of characters to be recorded, whereby the individual time intervals required for selection and recording of individual characters may overlap in duration, thereby permitting selecting and recording a plurality of said characters along said line within substantially the same time interval length as the average time interval length required to select and record a single said character.

20. A telegraph system as set forth in claim 19 in which the said recording energy gradients are produced between points located on only one side of the said recording medium.

21. A telegraph system as set forth in claim 19 in which the said recording energy gradients are produced between points located on opposite sides of the recording medium.

22. A telegraph system as set forth in claim 19 in which each of said characters comprises a plurality of separate elemental areas, said elemental areas having an interfitting relationship to each other so that certain of the said elemental areas are common to different characters, and in which each of said elemental areas is connected to a separate recording-energy-gradient producing means.

23. A telegraph system as set forth in claim 19 in which each of the said recordable characters comprises a plurality of electrodes and in which the said non-mechanical electronic recording means includes means for forcing electric currents through said electrodes, and in which the said recording energy gradients acting on said medium are those gradients associated with said electric currents.

24. In a telegraph system, a receiving station page-printer mechanism including a sensitized page-style recording medium; a plurality of character-recording positions spatially disposed along at least one line traversing said medium; primary character-forming means operable under substantial gas pressure, spatially disposed in at least one row traversing said recording medium substantially parallel to said line of character-recording positions and defining a plurality of recordable characters certain of which are different in shape from others of said characters; character-selecting means whereby any one of a plurality of said different characters may be selected to be formed within any one of said character-recording positions by said primary character-forming means, and wherein the respective lengths of time required for selection of certain of said characters may overlap in duration; non-mechanical electronic recording means whereby any one of said characters formed within any one of said character-recording positions may be instantaneously recorded onto said medium by non-mechanical electronically produced recording energy gradients acting on said medium, said recording energy gradients including thermal energy gradients; means for advancing said medium in a direction substantially at right angles to said line of character-recording positions; and means controlling said recording energy and selection of characters to be recorded, whereby the individual time intervals required for selection and recording of individual characters may overlap in duration, thereby permitting selecting and recording a plurality of said characters along said line within substantially the same time interval length as the average time interval length required to select and record a single said character.

25. A telegraph system as set forth in claim 24 in which the said recording energy gradients are produced between points located on only one side of the said recording medium.

26. A telegraph system as set forth in claim 24 in which each of the said characters comprises a plurality of separate elemental areas connected together and further connected to a separate recording-energy-gradient producing means individual to each character, the elemental areas comprising each character being separate and distinct from the elemental areas comprising each other character, and certain of the elemental areas comprising certain of said characters being disposed within the outlines of certain other of said characters.

27. A telegraph system as set forth in claim 24 in which each of the said recordable characters comprises a plurality of electrodes and in which the said non-mechanical electronic recording means includes means for forcing electric currents through said electrodes, and in which the said recording energy gradients acting on said medium are those gradients associated with said electric currents.

References Cited in the file of this patent

UNITED STATES PATENTS

| | | |
|---|---|---|
| 1,725,533 | Lee | Aug. 20, 1929 |
| 2,178,410 | Conrad | Nov. 7, 1939 |
| 2,248,522 | Conrad | July 8, 1941 |
| 2,291,476 | Kernkamp | July 28, 1942 |
| 2,486,985 | Ruderfer | Nov. 1, 1949 |
| 2,510,072 | Clark | June 6, 1950 |
| 2,686,222 | Walker et al. | Aug. 10, 1954 |
| 2,735,956 | McNaney | Feb. 21, 1956 |
| 2,736,770 | McNaney | Feb. 28, 1956 |
| 2,762,862 | Bliss | Sept. 11, 1956 |
| 2,777,745 | McNaney | Jan. 15, 1957 |
| 2,829,025 | Clemens | Apr. 1, 1958 |